US011222468B1

(12) United States Patent
Lovegrove et al.

(10) Patent No.: US 11,222,468 B1
(45) Date of Patent: Jan. 11, 2022

(54) OBJECT TRACKING USING SPARSE SENSOR CAPTURES

(71) Applicant: Facebook Technologies, LLC, Menlo Park, CA (US)

(72) Inventors: Steven John Lovegrove, Woodinville, WA (US); Richard Andrew Newcombe, Seattle, WA (US); Andrew Samuel Berkovich, Bellevue, WA (US); Lingni Ma, Redmond, WA (US); Chao Li, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/086,662

(22) Filed: Nov. 2, 2020

(51) Int. Cl.
*G06T 7/00* (2017.01)
*G06T 17/10* (2006.01)
*G06T 19/00* (2011.01)
*G06T 17/20* (2006.01)

(52) U.S. Cl.
CPC ............. *G06T 17/10* (2013.01); *G06T 7/97* (2017.01); *G06T 17/20* (2013.01); *G06T 19/006* (2013.01)

(58) Field of Classification Search
None
See application file for complete search history.

(56) References Cited

PUBLICATIONS

Yezzi et al., "A Geometric Approach to Joint 2D Region-Based Segmentation and 3D Pose Estimation Using a 3D Shape Prior", NIH, Public Access, 2010. (Year: 2010).*
Prisacariu, et al., PWP3D: Real-time Segmentation and Tracking of 3D Objects, 2012, pp. 1-23. Jan. 17, 2012.
Bibby, et al., Robust real-time visual tracking using pixel-wise posteriors, ECCV 2008, Part II, LNCS 5303, pp. 831-844, 2008.
Bibby, et al., Real-time tracking of multiple occluding objects using level sets, 2010 IFEE, 8 pages, 2010.
Tjaden, et al., Real-time monocular pose estimation of 3D objects using temporally consistent local color histograms, ICCV 2017, 9 pages, 2017.
Tjaden, et al., A region-based Gauss-Newton approach to real-time monocular multiple objects tracking, arXiv:1807.02087x72 [cs.Cv], 16 pages, 2018.

* cited by examiner

*Primary Examiner* — Nicholas R Wilson
(74) *Attorney, Agent, or Firm* — Baker Botts L.L.P.

(57) ABSTRACT

In one embodiment, a method includes instructing, at a first time, a camera with multiple pixel sensors to capture a first image of an environment comprising an object to determine a first object pose of the object. Based on the first object pose, the method determines a predicted object pose of the object at a second time. The method determines a predicted camera pose of the camera at the second time. The method generates pixel-activation instructions based on a projection of a 3D model of the object having the predicted object pose onto a virtual image plane associated with the predicted camera pose. The method instructs, at the second time, the camera to use a subset of the plurality of pixel sensors to capture a second image of the environment according to the pixel-activation instructions. The method determines, based on the second image, a second object pose of the object.

20 Claims, 9 Drawing Sheets

OBJECT TRACKING USING SPARSE SENSOR CAPTURES

TECHNICAL FIELD

This disclosure generally relates to object tracking, and in particular relates to object tracking based on image captures.

BACKGROUND

Traditionally, object tracking requires the capture of full images to track detectable features within the image. Traditional methods of using captured images to track objects is computationally expensive, as it requires a significant amount of power to handle the large amounts of pixel data being transferred from the image sensor's buffer to memory and subsequent reading out of memory to be processed. Further, object tracking requiring the capture of full images can introduce latency, as it can increase the time necessary to read out the full image. As this process can be power intensive, this can significantly limit the ability of power-constrained devices such as mobile devices or AR/VR devices to track an object using image captures.

SUMMARY OF PARTICULAR EMBODIMENTS

In particular embodiments, one or more computing systems may instruct, at a first time, a camera with multiple pixel sensors to capture a first image of an environment comprising an object to determine a first object pose of the object. Based on the first object pose, the computing system can determine a predicted object pose of the object at a second time. The computing system can determine a predicted camera pose of the camera at the second time. Then, the computing system can generate pixel-activation instructions based on a projection of a 3D model of the object having the predicted object pose onto a virtual image plane associated with the predicted camera pose. The computing system can instruct, at the second time, the camera to use a subset of the plurality of pixel sensors to capture a second image of the environment according to the pixel-activation instructions. Then, the computing system can determine, based on the second image, a second object pose of the object.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may track an object in an environment based on image captures. Traditional methods of using captured images to track objects require a significant amount of power due to the large amounts of pixel data being transferred from the image sensor's buffer to memory and subsequently processed. However, for purposes of object tracking, not all pixels are needed. A predictive model can predict how an object would move in the environment, and then capture a subset of pixels of the object (e.g., pixels located along the contour of an object and/or pixel samples within the contour) where the object was predicted to move. The captured pixel information may then be used to track and update the 3D model of the object in the environment. As an example and not by way of limitation, the computing system may track one or more persons and/or objects moving through an environment. For example, a person may be walking towards a table and computing system may predict that the person will climb onto the table. As another example and not by way of limitation, an object such as a ball may be rolling towards the table. The computing system may predict the ball will bounce off the table legs when it hits it. Further, when tracking multiple persons and/or objects, the computing system can determine which persons and/or objects are occluded or going to be occluded by one another. That is, the computing system can ignore pixels for persons and/or objects that are not expected to be visible. Although this disclosure describes tracking objects in an environment based on image captures in a particular manner, this disclosure contemplates tracking objects in an environment based on image captures in any suitable manner.

Figure 1:
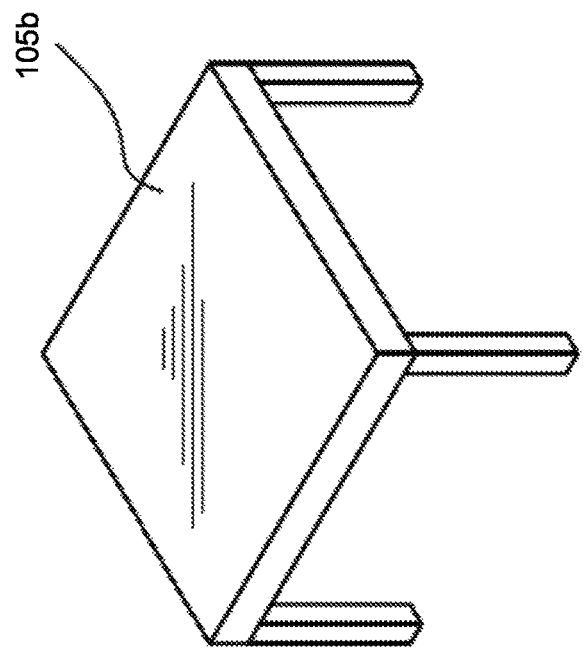
FIG. 1 illustrates an environment.
Figure 1:
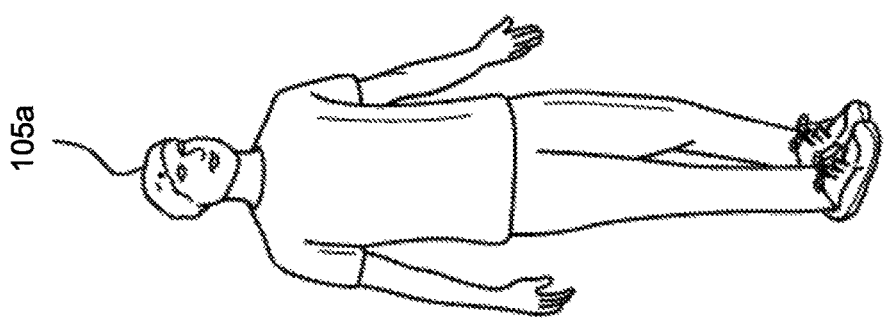
Figure 1:
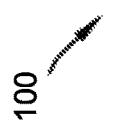
Figure 2:
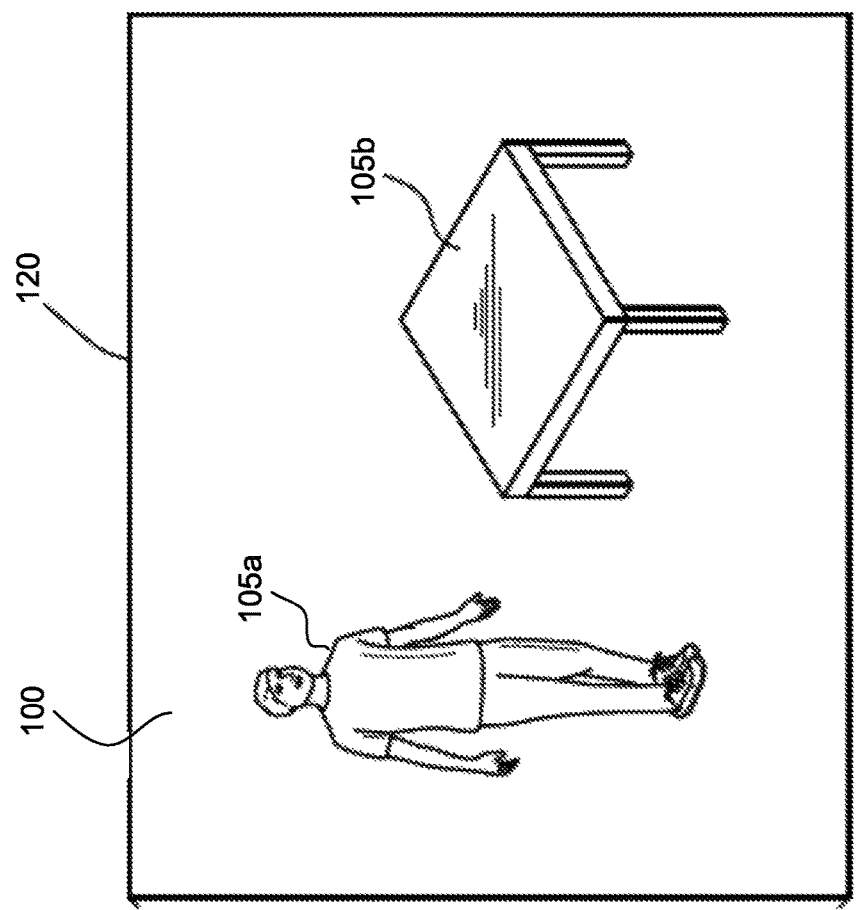
FIG. 2 illustrates an first image capture of the environment.
Figure 2:
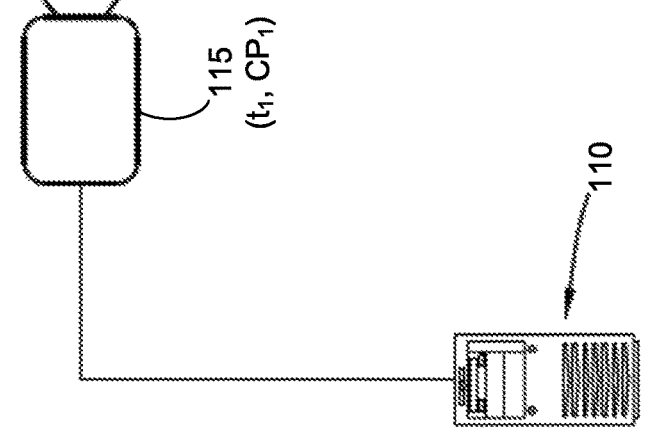

FIG. 1 illustrates an environment 100. The environment 100 may contain one or more objects 105, e.g., a person 105a and a table 105b. FIG. 2 illustrates a first image capture of the environment. In particular embodiments, a computing system 110 may instruct, at a first time, a camera 115 (e.g., a camera, AR/VR headset, etc.) having a plurality of pixel sensors to use the plurality of pixel sensors to capture a first image of the environment 100 comprising the one or more objects 105 within a camera field of view 120. There may be one or more cameras having a plurality of pixel sensors to capture the image (comprising a plurality of pixels) of the environment 100, where the plurality of pixels can be captured by any of the one or more cameras. The sensors may be positioned to reduce transmission latency, e.g., by positioning the sensors near the computing system 110. The camera 115 may have a first camera pose $CP_1$ that measures the position and orientation of the camera 115 at a first time $t_1$. As an example and not by way of limitation, the first camera pose $CP_1$ can be determined using sensors, accelerometers, gyroscopes, or other position sensors on the camera 115. The image capture may be a full resolution image capture of the one or more objects 105 in the environment 100. In some implementations, the camera 115 may capture features of the one or more objects 105. As an example and not by way of limitation, the camera 115 may capture specific or high gradient features of the person 105a, such as the person's face, eyes, or nose. This may be useful as capturing specific or high gradient features may indicate the position and orientation of the person 105a, or serve as an indication of potential direction of movement. In particular embodiments, the computing system 110 may identify an object type based on the first image. As an example and not by way of limitation, the computing system 110 may use an image processor to determine that the object 105 is an animate object such as a person or rolling ball, or an inanimate object such as a table. Although this disclosure describes the computing system 110 instructing the camera 115 to capture a first image at a first time in a particular manner, this disclosure contemplates capturing the first image at the first time in any suitable manner.

Figure 3:
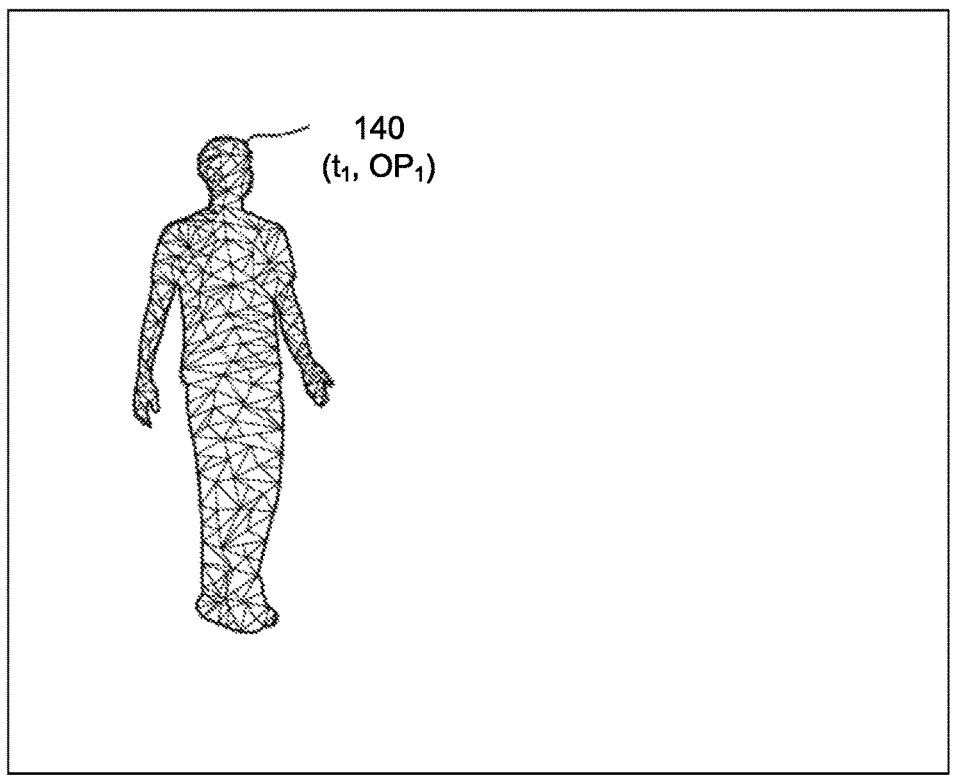
FIG. 3 illustrates a 3D model of the object with the first object pose.

FIG. 3 illustrates a 3D model of the object with the first object pose $OP_1$ 140. In particular embodiments, the computing system 110 may determine, based on the first image capture, a first object pose $OP_1$ measuring the position and orientation of the object 105 (e.g., the person 105a) in the environment 100 at the first time $t_1$. The first image capture may be used to construct the 3D model of the object with the first object pose $OP_1$ 140. As an example and not by way of limitation, the computing system 110 may capture an image of the environment 100 containing the person 105a and the table 105b, and create a 3D model of the person 105a, as only the person 105a is being tracked. The 3D model of the object with first object pose $OP_1$ 140 can be a wire mesh of the person 105a with the first object pose $OP_1$. As an example and not by way of limitation, determining the first object pose $OP_1$ may be done using localization techniques, such as SLAM. Although this disclosure describes measuring the first object pose $OP_1$ in a particular manner, this disclosure contemplates measuring the first object pose $OP_1$ in any suitable manner.

Figure 4:
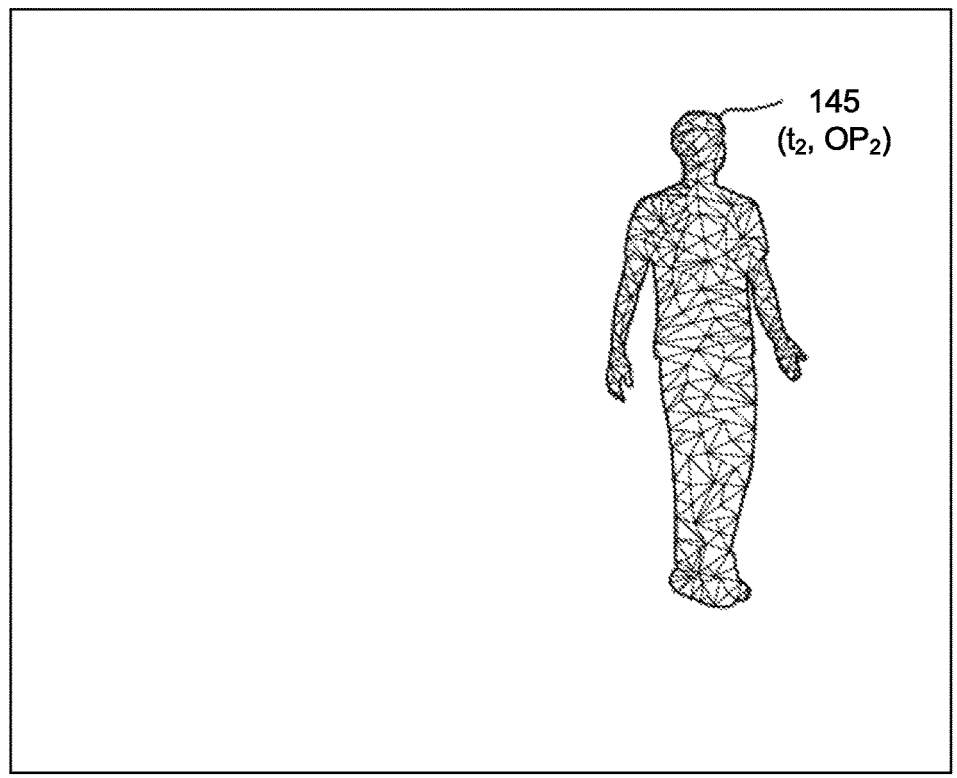
FIG. 4 illustrates a 3D model of the object with the predicted object pose.

FIG. 4 illustrates a 3D model of the object with the predicted object pose $OP_2$ 145. In particular embodiments, the computing system 110 may determine, based on the first object pose $OP_1$, a predicted object pose $OP_2$ (e.g., the object pose at a second time $t_2$) of the object 105. In some embodiments, the computing system 110 may determine where the object 105 may be when the camera 115 captures the next frame, e.g., when the camera 115 captures the second image capture at the second time $t_2$. For example, the computing system 110 may access a prediction model associated with the object type of the object 105 based on the first image capture, and use the prediction model to determine the 3D model of the object with the predicted object pose $OP_2$ 145. As an example and not by way of limitation, the computing system 110 may determine, e.g., using an image processor, that an inanimate table (e.g., the table 105b) will not move, while a walking person (e.g., the person 105a) or a rolling ball will move or stop moving in a certain way. As a further example, the computing system 110 may determine that the object 105 (e.g., the person 105a) is walking from left to right (relative to the camera field of view 120) based on a comparison of prior frames, or by analyzing the walking gait or momentum of the person 105a. Thus, the computing system 110 can determine the predicted object pose $OP_2$ by tracking both the object pose and the object dynamics (e.g., determined by an analysis of prior frames), which can further reduce the pixels necessary to resolve the predicted object pose $OP_2$. Thus, the computing system 110 may then determine that the object 105 will move to the right (relative to the camera field of view 120). As another example and not by way of limitation, the computing system 110 may determine that a ball rolling towards a table may continue rolling for the next few seconds, and when the ball hits the table, the ball will stop rolling. As another example, the computing system 110 may determine that an object thrown up in the air will drop eventually drop towards the ground due to gravity. Although this disclosure describes determining the predicted object pose of the object 105 at a second time $t_2$ in a particular manner, this disclosure contemplates determining the predicted object pose $OP_2$ in any suitable manner.

Figure 5:
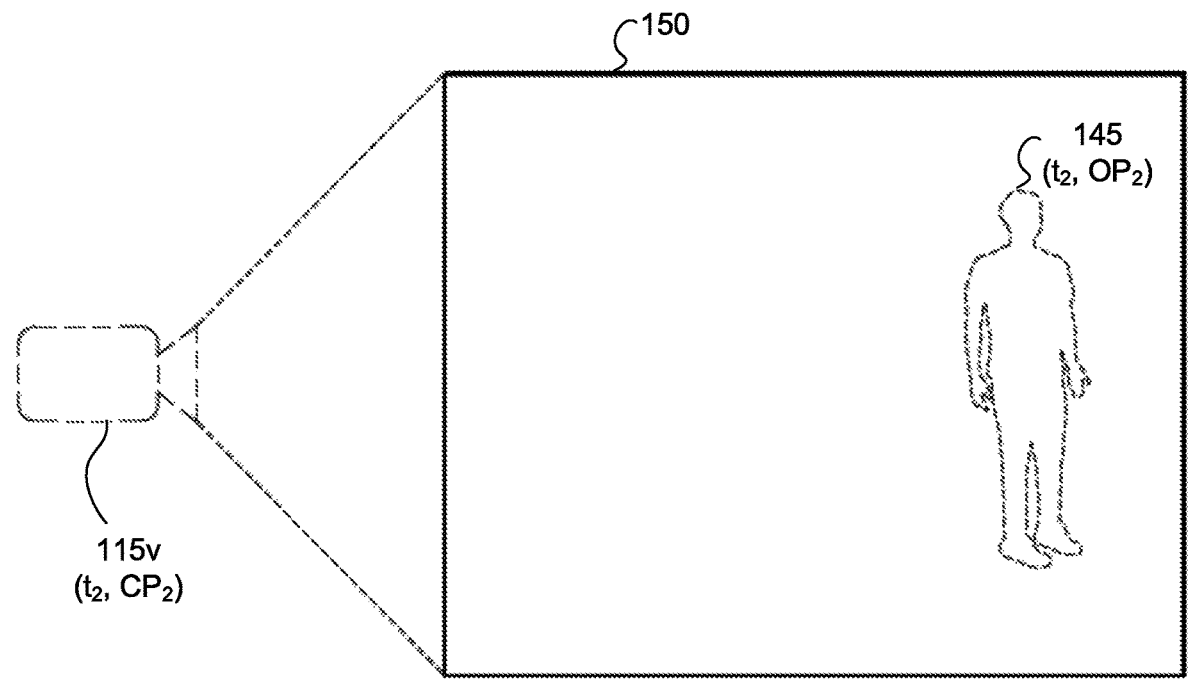
FIG. 5 illustrates a predicted virtual environment with the 3D model of the object with a predicted object pose and the predicted camera pose.

FIG. 5 illustrates a predicted virtual environment 150 of the 3D model of the object with a predicted object pose $OP_2$ 145 and the predicted camera pose $CP_2$. In particular embodiments, the computing system 110 may determine a predicted camera pose $CP_2$ of the camera 115 at the second time $t_2$. This may be done using sensors, accelerometers, gyroscopes, or other position sensors on the camera 115 to determine the predicted camera pose $CP_2$ (e.g., the position and orientation of a virtual camera 115v) at the second time $t_2$. As an example and not by way of limitation, the computing system 110 may determine that a camera on a person's head (e.g., an AR/VR headset) will rotate as the person's head rotates while tracking a moving object, and determine the position and orientation of the camera. Although this disclosure describes determining the predicted camera pose $CP_2$ of the camera 115 at the second time $t_2$ in a particular manner, this disclosure contemplates determining the predicted camera pose $CP_2$ of the camera 115 at the second time $t_2$ in any suitable manner.

Figure 6:
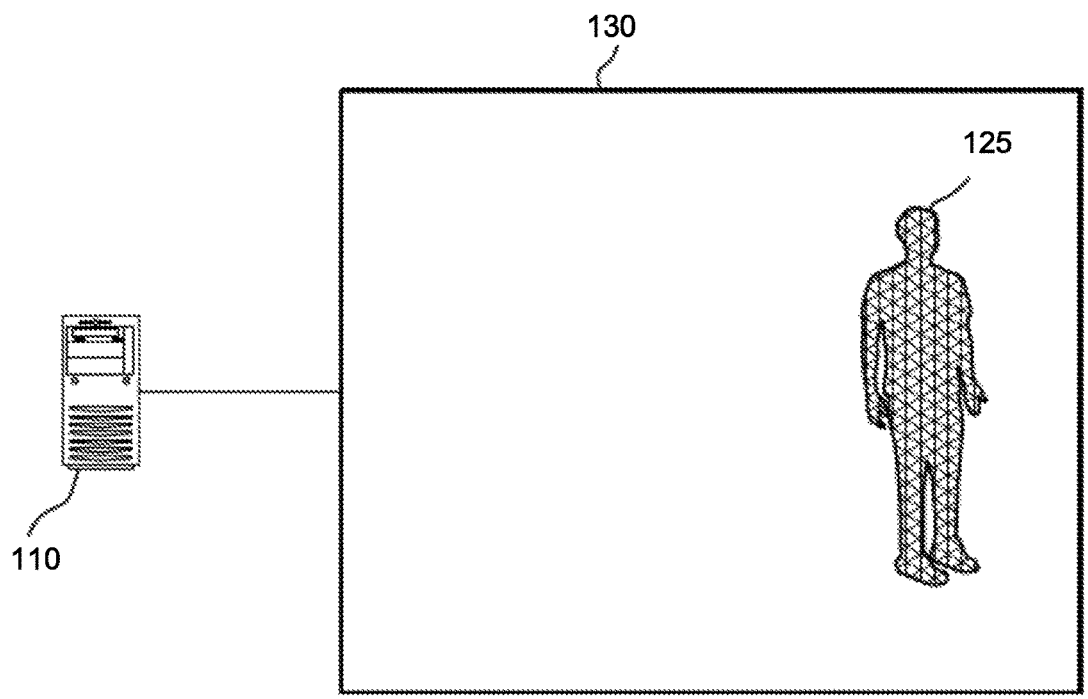
FIG. 6 illustrates an activation map.

FIG. 6 illustrates an activation map 130. In particular embodiments, the computing system 110 may generate pixel-activation instructions based on a projection of a 3D model of the object 125 having the predicted object pose onto a virtual image plane associated with the predicted camera pose $CP_2$. The virtual image plane may be the activation map 130, which will have the same number of pixels and resolution as the first image capture. The computing system 110 may generate instructions for the activation map 130 to measure or sample the pixels corresponding to the projection of the 3D model of the object 125 (e.g., a 2D "shadow" of the 3D model of the object with a predicted object pose $OP_2$ 145). As an example and not by way of limitation, the computing system 110 may generate pixel-activation instructions to measure or sample the pixels of a person based on the person's predicted pose of moving from next to a table to on top of the table. Although this disclosure describes generating pixel-activation instructions in a particular manner, this disclosure contemplates generating pixel-activation instructions in any suitable manner.

Figure 7:
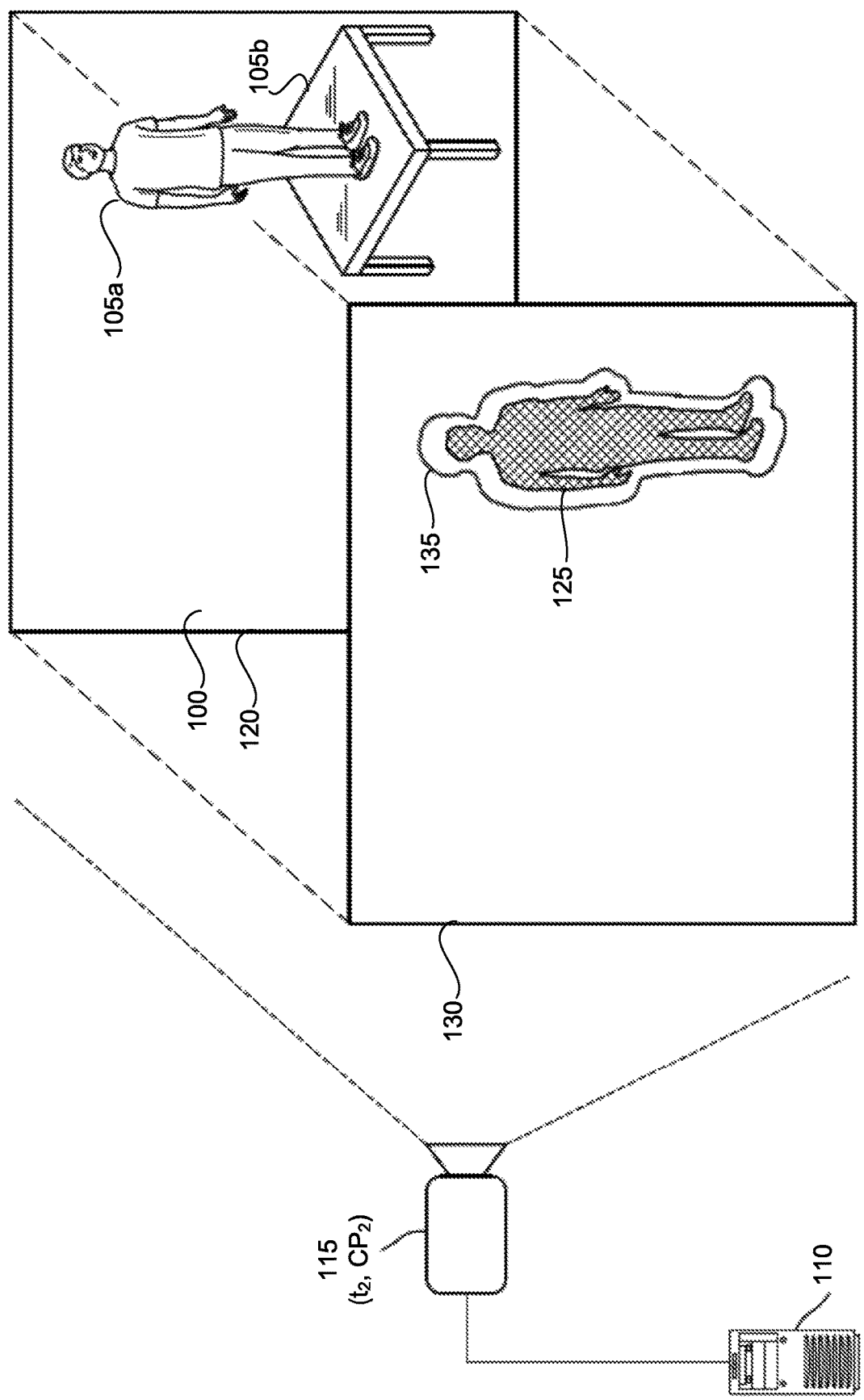
FIG. 7 illustrates an overlay of the activation map and the environment.
Figure 8C:
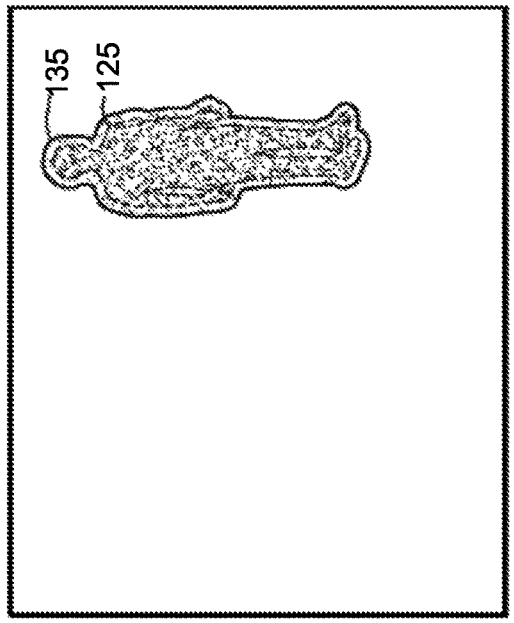
FIGS. 8A-8D illustrate example alternate pixel activations within the buffer region.
Figure 8D:
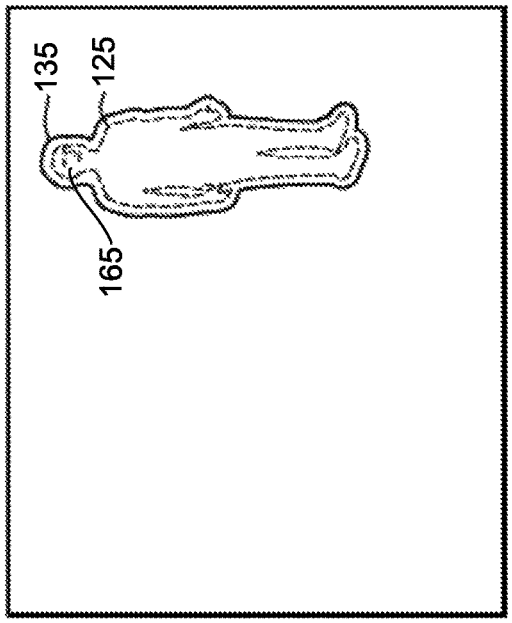
Figure 8A:
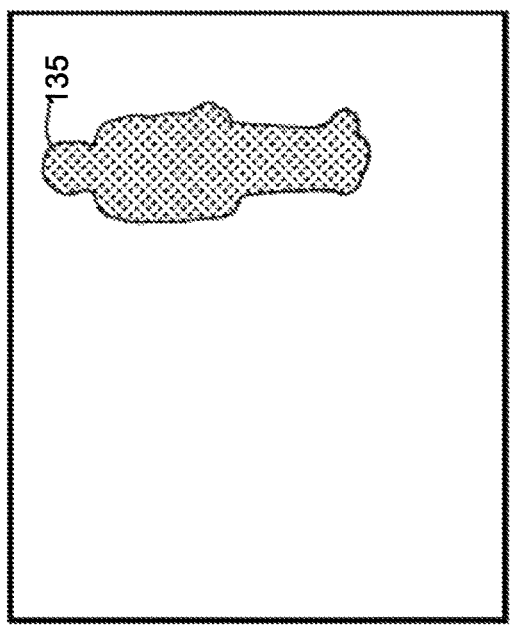
Figure 8B:
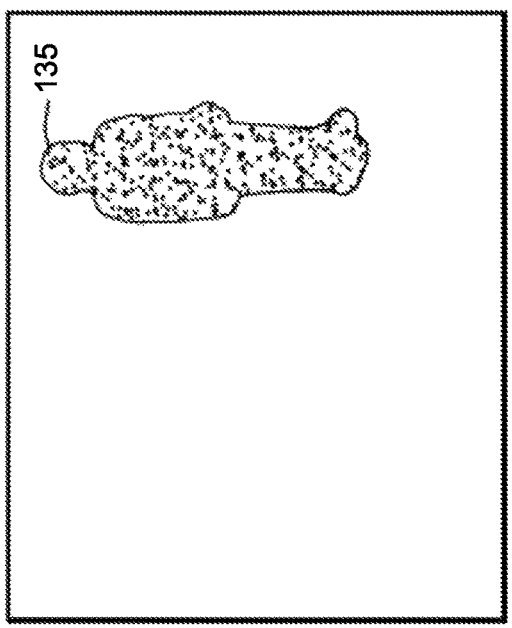

FIG. 7 illustrates an overlay of the activation map 130 and the environment 100. In particular embodiments, the computing system 110 may instruct, at the second time (e.g., the second time $t_2$), the camera 115 to use a subset of the plurality of pixel sensors to capture a second image of the environment according to the pixel-activation instructions. That is, the camera 115 may measure or sample the pixels associated with the projection of the 3D model of the object 125 that was projected onto the virtual plane of the activation map 130. The activation map 130 corresponds to the predicted pose of the object 105 (e.g., the person 105a) in the environment 100. As an example and not by way of limitation, after the computing system 110 determines that the object 105 (e.g., the person 105a) was going to be on top of the table 105b at the second time $t_2$, the computing system 110 may instruct the camera to take another picture of the environment 100 by measuring only the pixels identified in the activation map 130 (e.g., only the pixels that correspond to the projection of the 3D model of the object 125). In particular embodiments, the computing system 110 may activate a first subset of the plurality of pixels sensors (e.g., the pixels identified in the activation map 130 that correspond to the projection of the 3D model of the object 125), while a second subset of the plurality of pixel sensors are inactivated at the second time to capture the second image (e.g., all the pixels that do not correspond to the projection of the 3D model of the object 125). That is, only the pixels associated with the object being tracked may be activated, while pixels that are not associated with the object being tracked are not activated. This can reduce the amount of power needed to capture the image. As an example and not by way of limitation, the pixel sensors associated the pixels measuring the person 105a stepping onto the table 105b will be activated, while the pixel sensors associated with pixels that may measure the ceiling, wall, or other non-tracked objects (e.g., the table 105b) will not be activated. Although this disclosure describes using a subset of pixel sensors to capture the second image of the environment 100 in a particular manner, this disclosure contemplates using a subset of pixel sensors to capture the second image of the environment 100 in any suitable manner.

In particular embodiments, the pixel-activation instructions may be further generated based on a buffer region 135 around the projection of the 3D model of the object 125. As an example and not by way of limitation, the computing system 110 may generate a buffer region 135 that surrounds or contours the projection of the 3D model of the object 125. The size of the buffer region 135 may be proportional to the time between the first time and the second time, e.g., the time between $t_1$ and $t_2$. A larger time may result in a larger buffer region 135 (e.g., the buffer region for 1 second will be larger than the buffer region for 100 ms). Additionally, lower latency can lead to less uncertainty in the prediction, and result in a smaller buffer region 135. The smaller buffer region 135 can then reduce the amount of pixel data to be processed, further reducing latency. The size of the buffer region may be proportional to the framerate of the camera 115. A camera with a high framerate may have a smaller buffer region than a camera with a low framerate.

FIGS. 8A-8D illustrate example alternate pixel activations within the buffer region 135. In particular embodiments and with reference to FIG. 8A, the computing system 110 may activate all the pixels within the buffer region 135. In particular embodiments and with reference to FIG. 8B, the computing system 110 may activate a sparse sample of pixels within the buffer region 135. For example, 1 in every 10, 100, or 1000 pixels may be sampled within the buffer region 135. In particular embodiments and with reference to FIG. 8C, the computing system 110 may increase the number of pixels to be sampled within the portion of the buffer region 135 that corresponds to the projection of the 3D model of the object 125. For example, there may be a denser sampling of pixels for the projection of the 3D model of the object with a sparser sampling of pixels for the buffer region 135. In particular embodiments and with reference to FIG. 8D, the computing system 110 may increase the number of pixels to be sampled within the portion of the projection of the 3D model of the object 125 that corresponds to high gradient features 165 (e.g., eyes, nose, mouth, etc. on a face of a person). In particular embodiments and with particular reference to FIGS. 8B-8D, as fewer pixels are activated, a higher framerate may be enabled for the same power and bandwidth, which can lead to lower latency for object tracking. Additionally, the size of the buffer region 135 may be determined by the predicted dynamics of the object being tracked. For example, an object thrown up in the air will eventually drop towards the ground in a predicted motion due to gravity and may have a smaller buffer region, whereas a cat chasing a laser pointer may have a larger buffer region due to the cat's less predictable dynamics.

Figure 9:
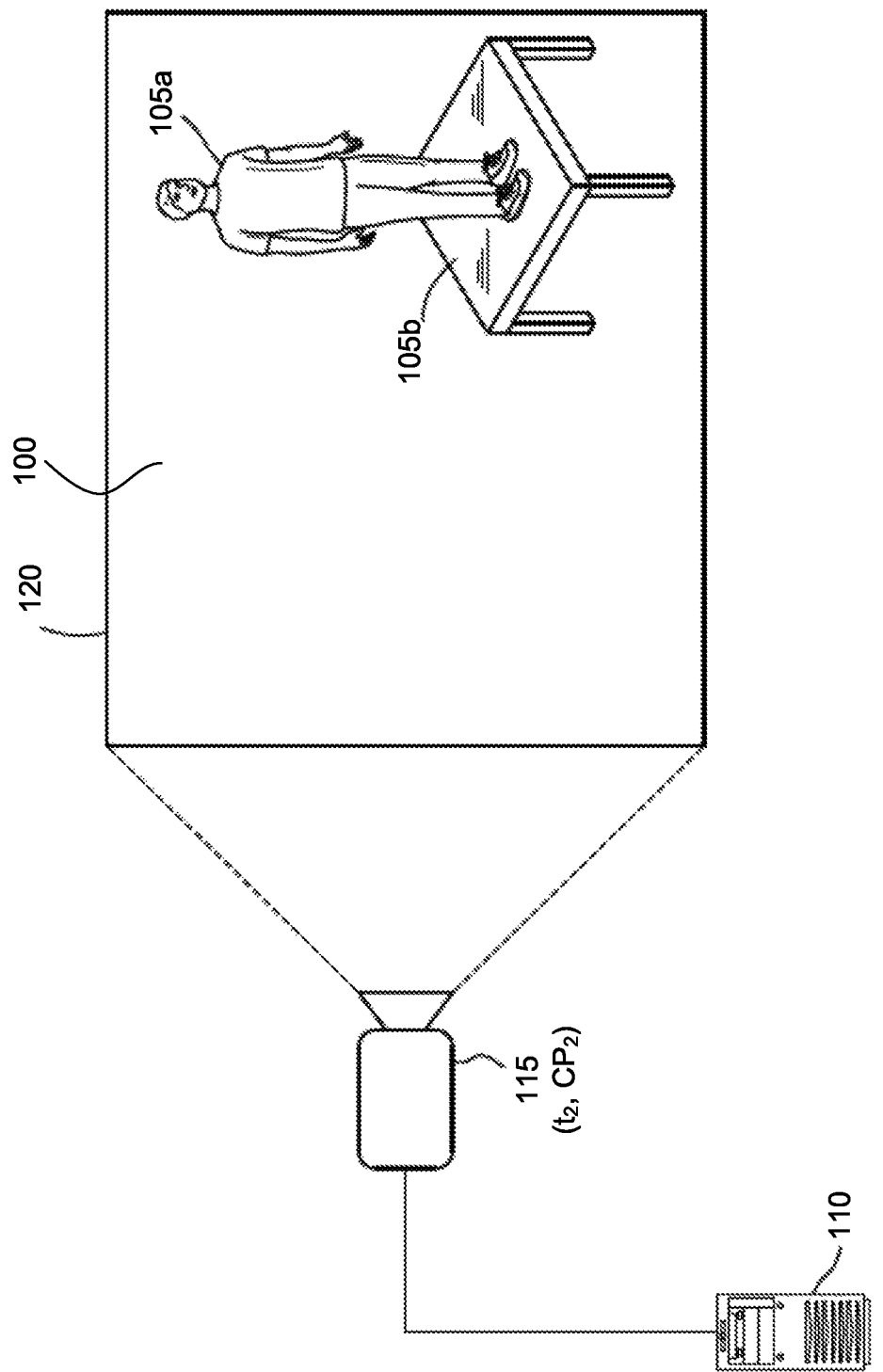
FIG. 9 illustrates a second image capture of the environment.

FIG. 9 illustrates a second image capture of the environment 100. In particular embodiments, the computing system 110 may determine, based on the second image capture of the environment 100 at the second time $t_2$, a second object pose of the object 105 (e.g., the person 105a). As an example and not by way of limitation, the computing system 110 may determine that the second object pose of the object 105 (e.g., the person 105a) is on top of the table 105b. The process may be repeated to continue tracking the object 105, for example, to predict that after the person 105a stepped onto the table 105b, the person 105a will step off of the table 105b based on prior tracked object poses. In particular embodiments, the computing system 110 may generate an artificial-reality effect based on the second object pose of the object 105 and display the artificial-reality effect using a head-mounted device worn by a user, such as an AR/VR headset. As an example and not by way of limitation, the computing system 110 may create a virtual course that awards points for the object being tracked as it moves through the environment. Thus, the person 105a may see, through an AR/VR headset, a course or path to follow that takes the person 105a onto and then off of the table 105b. As another example and not by way of limitation, the computing system 110 may generate a virtual object (such as a virtual pet) that can follow the person 105a as they move through the environment 100. An advantage is that the reduced latency due to the reduced pixel data size can increase the quality of the AR/VR experience. For example, virtual occlusions can be closely aligned to the tracked object to accurately render a feature, avatar, or character adjacent to the tracked object. Although this disclosure describes determining the second object pose of the object 105 in a particular manner, this disclosure contemplates determining the second object pose of the object 105 in any suitable manner.

Figure 10:
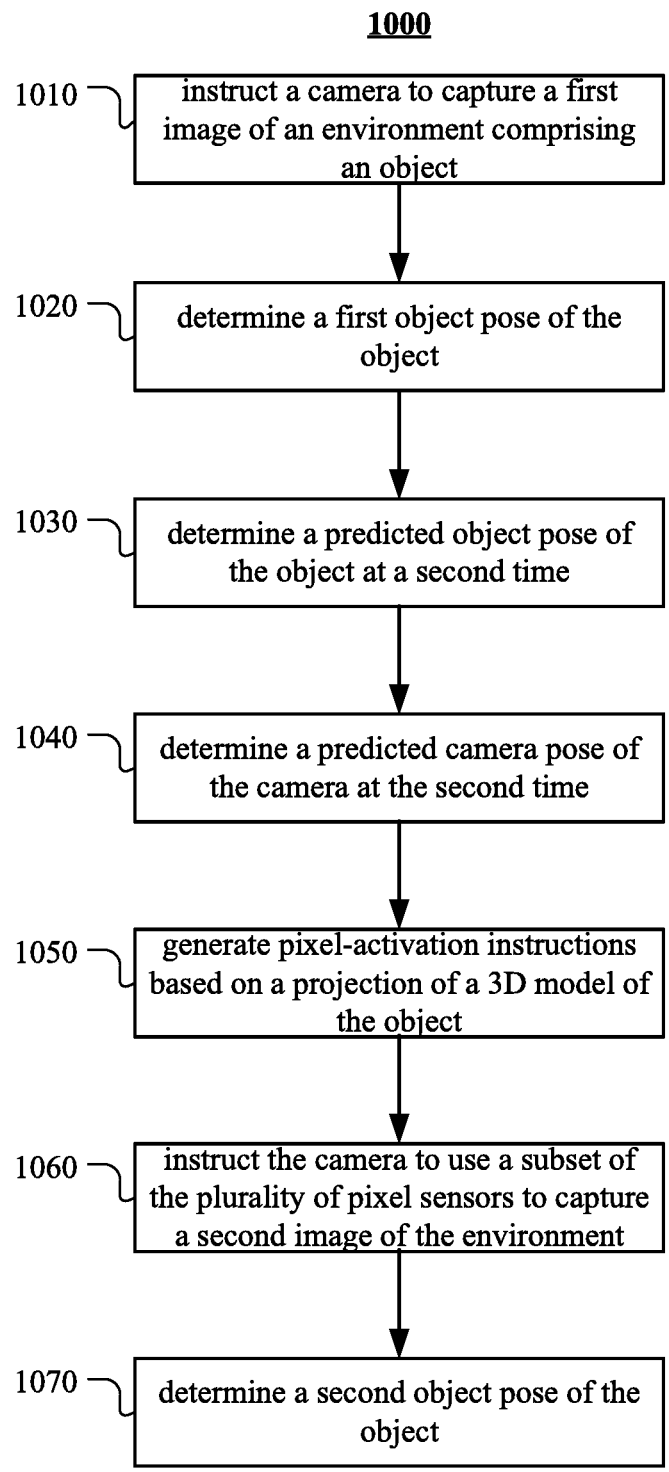
FIG. 10 illustrates an example method for tracking an object in an environment based on image captures.

FIG. 10 illustrates an example method 1000 for tracking an object in an environment based on image captures. The method may begin at step 1010, where a computing system 110 instructs, at a first time, a camera having a plurality of pixel sensors to use the plurality of pixel sensors to capture a first image of an environment comprising an object. At step 1020, the computing system 110 determines, based on the first image, a first object pose of the object. At step 1030, the computing system 110 determines, based on the first object pose, a predicted object pose of the object at a second time. At step 1040, the computing system 110 determines a predicted camera pose of the camera at the second time. At step 1050, the computing system 110 generates pixel-activation instructions based on a projection of a 3D model of the object having the predicted object pose onto a virtual image plane associated with the predicted camera pose. At step 1060, the computing system 110 instructs, at the second time, the camera to use a subset of the plurality of pixel sensors to capture a second image of the environment according to the pixel-activation instructions. At step 1070, the computing system 110 determines, based on the second image, a second object pose of the object. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for tracking an object in an environment based on image captures including the particular steps of the method of FIG. 10, this disclosure contemplates any suitable method for tracking an object in an environment based on image captures including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Figure 11:
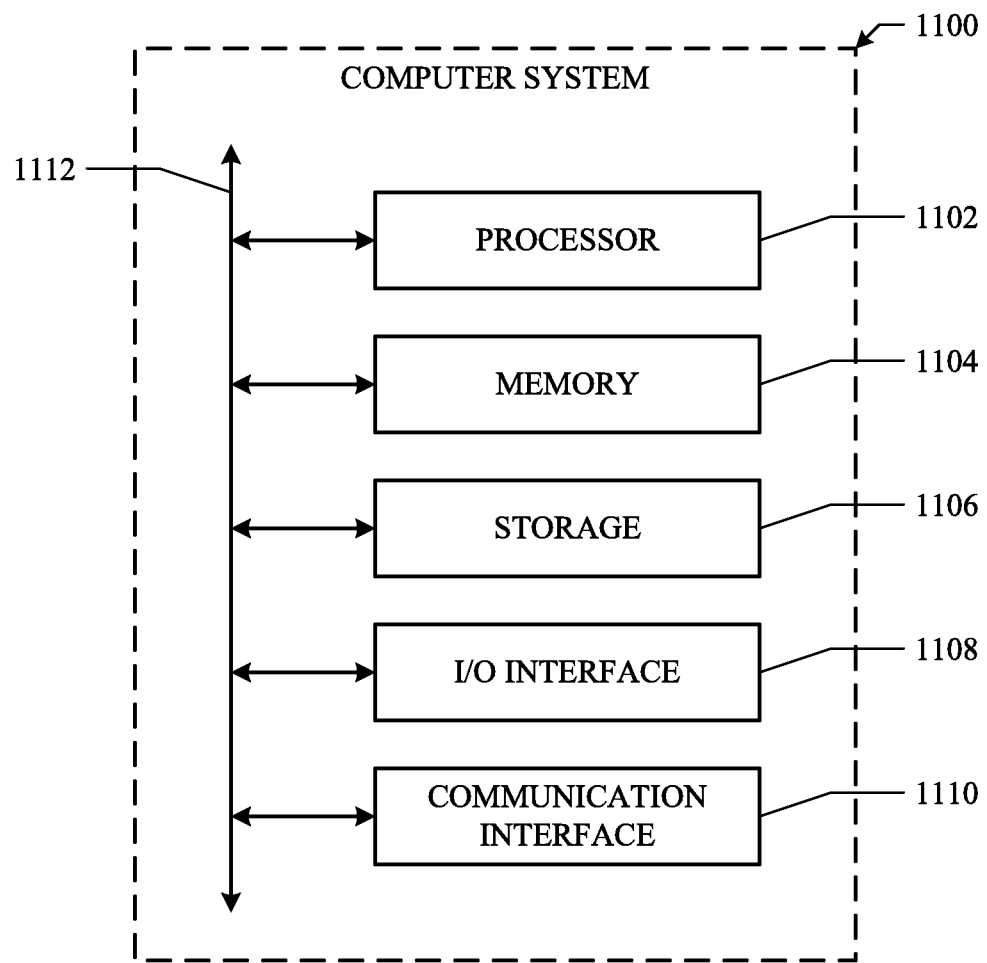
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    instructing, at a first time, a camera having a plurality of pixel sensors to use the plurality of pixel sensors to capture a first image of an environment comprising an object;
    determining, based on the first image, a first object pose of the object;
    determining, based on the first object pose, a predicted object pose of the object at a second time;
    determining a predicted camera pose of the camera at the second time;
    generating pixel-activation instructions based on a projection of a 3D model of the object having the predicted object pose onto a virtual image plane associated with the predicted camera pose;
    instructing, at the second time, the camera to use a subset of the plurality of pixel sensors to capture a second image of the environment according to the pixel-activation instructions; and
    determining, based on the second image, a second object pose of the object.

2. The method of claim 1, wherein the subset of the plurality of pixel sensors are activated and a second subset of the plurality of pixel sensors are inactivated at the second time to capture the second image.

3. The method of claim 1, further comprising:
    identifying an object type of the object based on the first image;
    accessing a prediction model associated with the object type; and
    using the prediction model to determine the predicted object pose of the object at the second time.

4. The method of claim 1, further comprising:
    generating an artificial-reality effect based on the second object pose; and
    displaying the artificial-reality effect using a head-mounted device worn by a user;
    wherein the camera is attached to the head-mounted device worn by the user.

5. The method of claim 1, wherein the pixel-activation instructions are further generated based on a buffer region around the projection of the 3D model of the object.

6. The method of claim 5, wherein the size of the buffer region is proportional to the time between the first time and the second time.

7. The method of claim 5, wherein the size of the buffer region is proportional to the framerate of the camera.

8. The method of claim 5, further comprising:
    activating all the pixels within the buffer region.

9. The method of claim 5, further comprising:
    activating a sparse sample of pixels within the buffer region.

10. The method of claim 9, further comprising:
    increasing the sampling of pixels within the projection of the 3D model within the buffer region.

11. One or more computer-readable non-transitory storage media embodying software that is operable when executed to:
    instruct, at a first time, a camera having a plurality of pixel sensors to use the plurality of pixel sensors to capture a first image of an environment comprising an object;
    determine, based on the first image, a first object pose of the object;
    determine, based on the first object pose, a predicted object pose of the object at a second time;
    determine a predicted camera pose of the camera at the second time;
    generate pixel-activation instructions based on a projection of a 3D model of the object having the predicted object pose onto a virtual image plane associated with the predicted camera pose;
    instruct, at the second time, the camera to use a subset of the plurality of pixel sensors to capture a second image of the environment according to the pixel-activation instructions; and
    determine, based on the second image, a second object pose of the object.

12. The media of claim 11, wherein the subset of the plurality of pixel sensors are activated and a second subset of the plurality of pixel sensors are inactivated at the second time to capture the second image.

13. The media of claim 11, wherein the software is further operable when executed to:
    identify an object type of the object based on the first image;
    access a prediction model associated with the object type; and
    use the prediction model to determine the predicted object pose of the object at the second time.

14. The media of claim 11, wherein the software is further operable when executed to:
  generate an artificial-reality effect based on the second object pose; and
  display the artificial-reality effect using a head-mounted device worn by a user;
  wherein the camera is attached to the head-mounted device worn by the user.

15. The media of claim 11, wherein the pixel-activation instructions are further generated based on a buffer region around the projection of the 3D model of the object.

16. A system comprising: one or more processors; and a non-transitory memory coupled to the processors comprising instructions executable by the processors, the processors operable when executing the instructions to:
  instruct, at a first time, a camera having a plurality of pixel sensors to use the plurality of pixel sensors to capture a first image of an environment comprising an object;
  determine, based on the first image, a first object pose of the object;
  determine, based on the first object pose, a predicted object pose of the object at a second time;
  determine a predicted camera pose of the camera at the second time;
  generate pixel-activation instructions based on a projection of a 3D model of the object having the predicted object pose onto a virtual image plane associated with the predicted camera pose;
  instruct, at the second time, the camera to use a subset of the plurality of pixel sensors to capture a second image of the environment according to the pixel-activation instructions; and
  determine, based on the second image, a second object pose of the object.

17. The system of claim 16, wherein the subset of the plurality of pixel sensors are activated and a second subset of the plurality of pixel sensors are inactivated at the second time to capture the second image.

18. The system of claim 16, wherein the processors are further operable when executing the instructions to:
  identify an object type of the object based on the first image;
  access a prediction model associated with the object type; and
  use the prediction model to determine the predicted object pose of the object at the second time.

19. The system of claim 16, wherein the processors are further operable when executing the instructions to:
  generate an artificial-reality effect based on the second object pose; and
  display the artificial-reality effect using a head-mounted device worn by a user;
  wherein the camera is attached to the head-mounted device worn by the user.

20. The system of claim 16, wherein the pixel-activation instructions are further generated based on a buffer region around the projection of the 3D model of the object.

* * * * *